United States Patent
Waffenschmidt et al.

(10) Patent No.: US 9,425,696 B2
(45) Date of Patent: Aug. 23, 2016

(54) RECTIFYING CIRCUIT AND METHOD FOR AN UNBALANCED TWO PHASE DC GRID

(71) Applicant: KONINKLIJKE PHILIPS N.V., Eindhoven (DE)

(72) Inventors: Eberhard Waffenschmidt, Aachen (DE); Ulrich Boeke, Langerwehe (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 27 days.

(21) Appl. No.: 14/422,485

(22) PCT Filed: Aug. 15, 2013

(86) PCT No.: PCT/IB2013/056665
§ 371 (c)(1),
(2) Date: Feb. 19, 2015

(87) PCT Pub. No.: WO2014/030104
PCT Pub. Date: Feb. 27, 2014

(65) Prior Publication Data
US 2015/0222189 A1    Aug. 6, 2015

Related U.S. Application Data

(60) Provisional application No. 61/691,847, filed on Aug. 22, 2012.

(51) Int. Cl.
*H02M 3/335* (2006.01)
*H02M 7/23* (2006.01)
*H02M 1/00* (2006.01)

(52) U.S. Cl.
CPC .......... *H02M 3/33507* (2013.01); *H02M 7/23* (2013.01); *H02M 2001/008* (2013.01)

(58) Field of Classification Search
CPC .............. H02M 3/33507; H02M 7/23; H02M 2001/008
USPC ........................... 363/16, 20–26, 65; 307/127
See application file for complete search history.

(56) References Cited

U.S. PATENT DOCUMENTS

| | | | | |
|---|---|---|---|---|
| 6,272,027 | B1 * | 8/2001 | Fraidlin | H02M 1/34 323/222 |
| 7,164,589 | B1 * | 1/2007 | Soldano | H02M 7/217 363/21.04 |
| 8,711,588 | B1 * | 4/2014 | Jeong | H02M 1/34 363/16 |
| 2003/0067792 | A1 | 4/2003 | Herfurth et al. | |
| 2010/0201285 | A1 | 8/2010 | Dellian et al. | |
| 2010/0296319 | A1 * | 11/2010 | Liu | H02M 3/285 363/21.12 |
| 2013/0121039 | A1 * | 5/2013 | Hsieh | H03F 3/217 363/21.17 |
| 2014/0211521 | A1 * | 7/2014 | Mazumder | H02M 7/48 363/40 |

FOREIGN PATENT DOCUMENTS

| | | |
|---|---|---|
| EP | 1592119 A2 | 11/2005 |
| JP | 2002325444 A | 11/2002 |
| WO | 2011060812 A1 | 5/2011 |

* cited by examiner

*Primary Examiner* — Gary L Laxton
*Assistant Examiner* — Kyle J Moody

(57) ABSTRACT

The present invention relates to a rectifying method and circuit using a magnetically coupled double flyback converter. The main circuit can consist of only one transformer, two switches, two low frequency diodes, two high frequency diodes and two capacitors, so that power is inherently distributed according to the demand on the two DC phases and a sinusoidal grid current can be obtained without sophisticated control.

9 Claims, 4 Drawing Sheets

RECTIFYING CIRCUIT AND METHOD FOR AN UNBALANCED TWO PHASE DC GRID

CROSS-REFERENCE TO PRIOR APPLICATIONS

This application is the U.S. National Phase application under 35 U.S.C. §371 of International Application No. PCT/IB13/056665, filed on Aug. 15, 2013, which claims the benefit of U.S. Provisional Patent Application No. 61/691,847, filed on Aug. 22, 2012. These applications are hereby incorporated by reference herein.

FIELD OF THE INVENTION

The invention relates to a rectifying circuit and method for providing an interface between an alternating current (AC) supply grid and a direct current (DC) grid such as a DC microgrid for lighting purposes, for example.

BACKGROUND OF THE INVENTION

A convergence of technologies is occurring that will change how buildings are powered. These technologies include the continued rapid growth of distributed generation resources (photovoltaic panels, wind turbines, fuel cells, micro turbines, etc.), the emergence of high-efficiency lighting technologies (especially solid-state LED lighting), wireless building automation systems, demand-side management of building energy use by electric utilities, and so on.

The rise of solid-state lighting, along with other DC-based systems including solar energy panels and wind energy, has encouraged many parties to pursue a DC-based power grid, that eliminates inefficient DC/AC and AC/DC power conversions that waste energy. With the new installations of solar and wind power and ramp-up of electrical vehicles on the market, an AC/DC hybrid coupled power network can consume up to 30% less energy, require 15% less capital and be 200% more reliable than existing systems. The use of DC microgrids eliminates AC/DC conversions at equipment level, simplifies equipment designs and layouts, provides improved interfaces with renewable energy sources and saves energy. Buildings can be made more sustainable by bringing hybrid AC-DC power architectures and DC microgrids to occupied spaces, data centers, building services, and outdoor applications.

DC backbone grids typically comprise a two phase DC grid with a positive voltage and a negative voltage, where the neutral conductor is connected to earth potential. The positive and the negative voltage have preferably the same absolute value. Loads are connected either only to the positive voltage or only the negative voltage or on the sum of positive and negative voltage.

As a problem, the interface between the AC supply grid and the two phase DC backbone of a DC microgrid must serve several different functions at the same time. It must rectify the voltage, create a sinusoidal current flow in the AC grid, provide the AC neutral conductor as ground conductor on the DC side and serve asymmetrical power demand on the two phases of DC side without creating any asymmetry on the AC side. Existing solutions for these demands require a large effort, e.g. a multi-stage converter.

A first straight forward solution would be to provide a full bridge rectifier to account for a symmetrical load on the positive and negative half waves, followed by a boost converter operated as power factor correction (PFC) converter to create a sinusoidal current, followed by power converter with two isolated outputs for the plus and the minus DC phases to be able to serve asymmetric load and to connect the DC ground to AC neutral. This solution requires a lot of components. Therefore, this circuit is disadvantageous.

A further solution would be to use two PFC circuits: A first PFC for the positive half wave serving the positive DC voltage and a second PFC for the negative half wave serving the negative DC voltage. This circuit requires less components, provides a sinusoidal AC current and immediately a connection from AC neutral to DC ground. However, an asymmetric load on the DC phases leads to an asymmetric AC current amplitude during the positive and the negative half wave. Therefore, this circuit is disadvantageous.

SUMMARY OF THE INVENTION

It is an object of the invention to provide a rectifying circuit and method for a DC grid, which requires few components and prevents assymetric AC currents.

This object is achieved by a circuit as claimed in claim 1 and by a method as claimed in claim 9.

Accordingly, the proposed solution is based on a simple circuit comprising a magnetically coupled double flyback converter, which can be implemented by very few components. As an example, only one transformer, consisting of four well coupled windings, two switches, two lower frequency diodes for the primary side of the transformer, two higher frequency diodes and two capacitors for the secondary side of the transformer. According to the proposed solution, power is inherently distributed according to the demand on the two DC outputs or phases. Furthermore, an asymmetric load on the DC output side does not lead to an asymmetry of the grid current drawn from the AC supply grid. A sinusoidal AC grid current can be achieved without sophisticated control.

According to a first aspect, the first and second primary windings are both connected with one end to a neutral line of the AC grid, and the first and second secondary windings are both connected with one end to ground potential of the DC grid. Thereby, the discharge current generated by the magnetic field stored in the core of the transformer is inherently distributed to the DC outputs based on their load.

According to a second aspect which can be combined with the first aspect, the neutral line of the AC grid can be directly connected to the ground potential of the DC grid.

According to a third aspect which may be combined with the first or second aspect, the first and second rectifier circuits may each comprise only one diode and one capacitor, so that circuit complexity can be kept low.

According to a fourth aspect which may be combined with any one of the first to third aspects, the first and second half-wave rectifiers may each comprise only one diode, which also serves to keep circuit complexity low.

According to a fifth aspect which can be combined with any one of the first to fourth aspects, the circuit may further comprise a first filter capacitor connected in parallel to the output of the first half-wave rectifier and a second filter capacitor connected in parallel to the output of the second half-wave rectifier. Thereby, an input filter can be incorporated into the rectifying circuit.

According to a sixth aspect which can be combined with any one of the first to fifth aspects, the circuit may be adapted to generate the first and second DC voltages with same absolute values. Thus, a two phase DC grid with positive and negative voltages of same absolute values can be provided.

According to a seventh aspect which can be combined with any one of the first to sixth aspects, a switching frequency of the first and second controlled switches may be selected in the 10 or 100 kHz range. Thereby, 1000 or even 10000 switching cycles can be achieved per half-wave period of the AC input signal.

Further advantageous embodiments are defined below.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Embodiments are now described based on a magnetically coupled double flyback converter or rectifier for connecting a two phase DC backbone of a DC microgrid to an AC supply grid. It is however noted that the present invention can be applied to any type interface between an AC supply grid and a DC grid.

Figure 1:
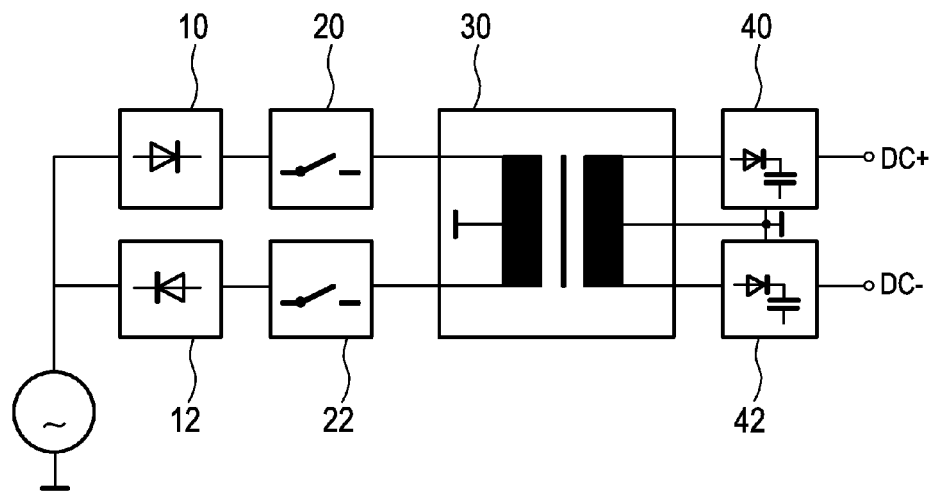
FIG. 1 shows a schematic functional block diagram of a rectifier circuit according to a first embodiment.

FIG. 1 shows a schematic functional block diagram of a double flyback rectifier according to a first embodiment. An AC voltage from the AC supply grid (exemplified in FIG. 1 as an AC voltage source) is supplied to first and second half-wave rectifier functions or circuits 10, 12, wherein the upper rectifier function or circuit 10 is adapted to output positive half-waves only, which are forwarded via a first controlled switching function or switch 20 to a first primary winding or winding portion of a transformer 30. The lower rectifier function or circuit 12 is adapted to output negative half-waves only, which are forwarded via a second controlled switching function or switch 20 to a second primary winding or winding portion of the transformer 30. At one of their ends both primary windings or winding portions are connected together and to earth potential of the AC grid, e.g., via the neutral line of a three-phase system. The first and second controlled switching functions or switches 20, 22 are adapted to continuously (e.g. periodically) switch on and off the supply of the respective half-waves to the respective primary winding or winding portion and to remain open during the supply of the respective other half-wave. The timing of the switching process (e.g. switching frequency in case of a periodic switching) may be selected to provide several on/off cycles per half-wave period, so that the half-wave current flowing through the primary windings or winding portions of the transformer 30 is chopped. Due to the fact that the primary circuits are repeatedly opened by the first and second switching functions or switches 20, 22 during the supply of the half-wave current, the magnetic field generated and stored in the magnetic core of the transformer 30 can only be relieved during these open-circuit periods by a discharge current at the secondary windings of the transformer 30. A first secondary winding or winding portion is connected via a first rectifier function or circuit 40 to a first (e.g. positive) DC output and a second secondary winding or winding portion is connected via a second rectifier function or circuit 42 to a second (e.g. negative) DC output. Both secondary windings or winding portions are connected at one of their ends to each other and to ground potential of the DC outputs. Thus, the discharge current generated in the secondary windings during the open or switch-off states of the switching functions or switches 20, 22 flows through the first and second rectifier functions or circuits 40, 42, so that a DC voltage is generated at the DC outputs.

The first and second half-wave rectifying functions or circuits 10, 12, the first and second switching functions or switches 20, 22 and the first and second rectifier circuits 40, 42 can be implemented by any circuitry which fulfils the described functionality and which can be used in the expected power range.

Figure 2:
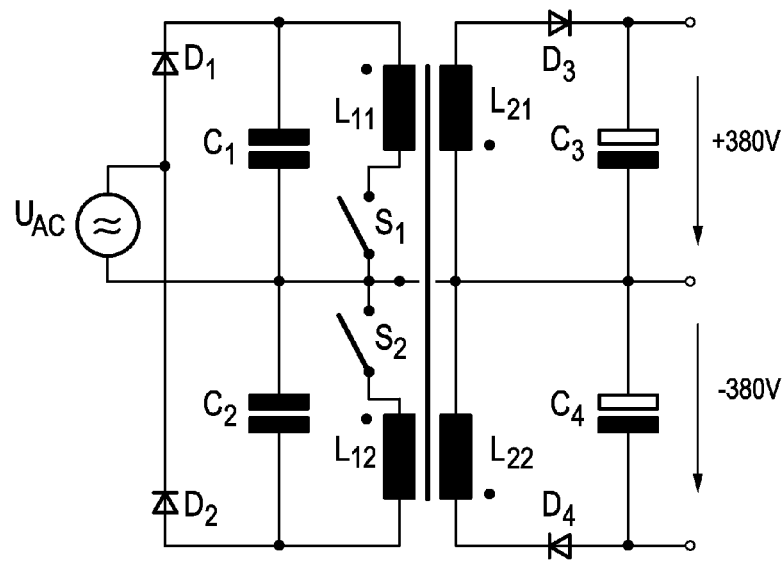
FIG. 2 shows a schematic circuit diagram of a rectifier circuit according to a second embodiment.

FIG. 2 shows a more detailed implementation of the double flyback rectifier circuit according to a second embodiment. Here, very few circuit components are needed. The main circuit consists of only one transformer having four well coupled windings $L_{11}$, $L_{12}$, $L_{21}$, $L_{22}$, two switches $S_1$ and $S_2$, two lower frequency diodes $D_1$ and $D_2$, two higher frequency diodes $D_3$ and $D_4$ and two capacitors $C_3$ and $C_4$. Optionally, two further capacitors $C_1$ and $C_2$ may be added to provide an additional input filter. In the example of FIG. 2, DC output voltages of +380V and −380V and thus same absolute values are generated. Of course, the circuit could be adapted to generate DC output voltages with different absolute values by suitable modification of the windings or other circuit components. The switches $S_1$ and $S_2$ may be implemented by controllable semiconductor switches, such as (power) transistors, thyristors or the like. The diode functions may be implemented by field effect transistors (FET) or other transistors, so as to obtain active rectifiers.

Figure 3:
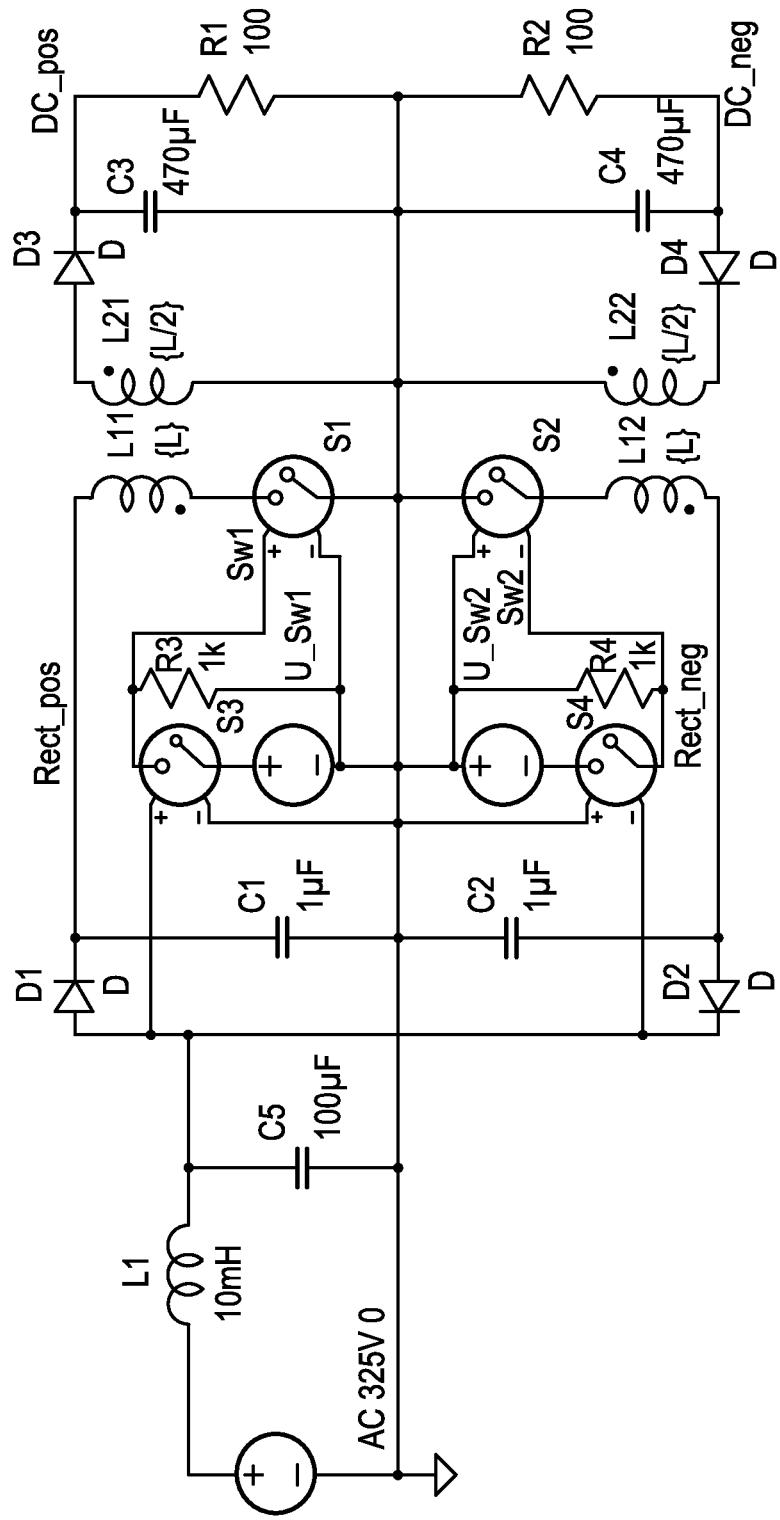
FIG. 3 shows a more detailed circuit diagram of a rectifier circuit according to a third embodiment.

To evaluate and illustrate the function of the circuit, a circuit simulation has been performed using LT-Spice. FIG. 3 shows the circuit diagram used for simulation according to a third embodiment. The denomination of the components corresponds to the principal circuit diagram in FIG. 2. It is noted that in the simulation the inductors L11, L12, L21 and L22 are well coupled with a coupling factor k=1. In addition, a simple control circuit consisting of U_Sw1, S3, R3 and Usw_2, S4, R4 is added. Furthermore, an input filter consisting of L1 and C5 is provided. The load on the positive DC phase is represented by R1 and the load on the negative DC phase by R2. S1 and S2 represent semiconductor switches, e.g., field effect transistors (FET).

Figure 4:
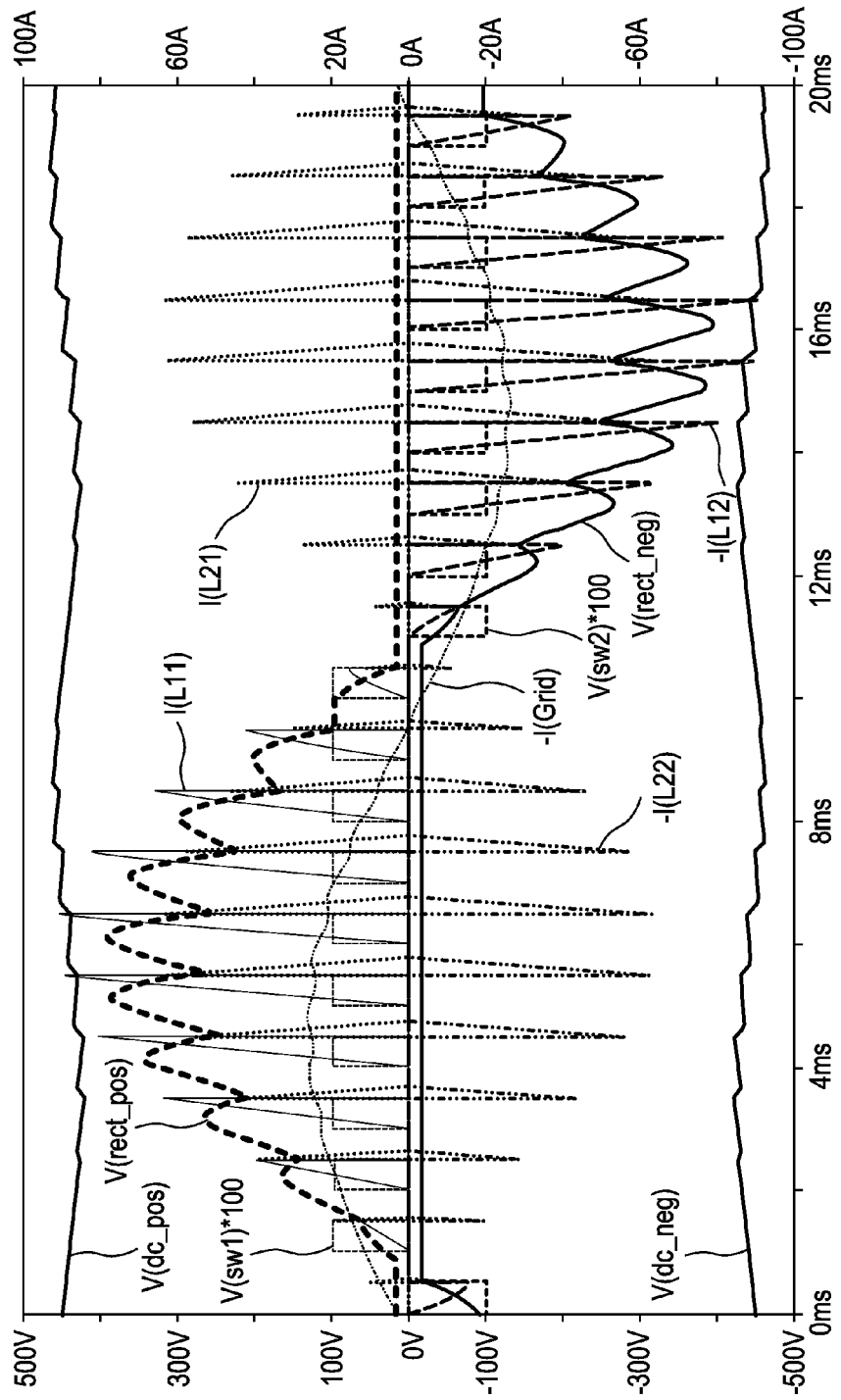
FIG. 4 shows a timing diagram with waveforms of currents and voltages in the rectifying circuit of the third embodiment with symmetric load at the DC outputs.

FIG. 4 shows a timing diagram with the time dependence of selected currents and voltages in the rectifying circuit of FIG. 3, if the load on the DC phases at the DC outputs DC_pos and DC_neg is balanced. In the present example, the loads R1 and R2 are 100Ω each.

Figure 5:
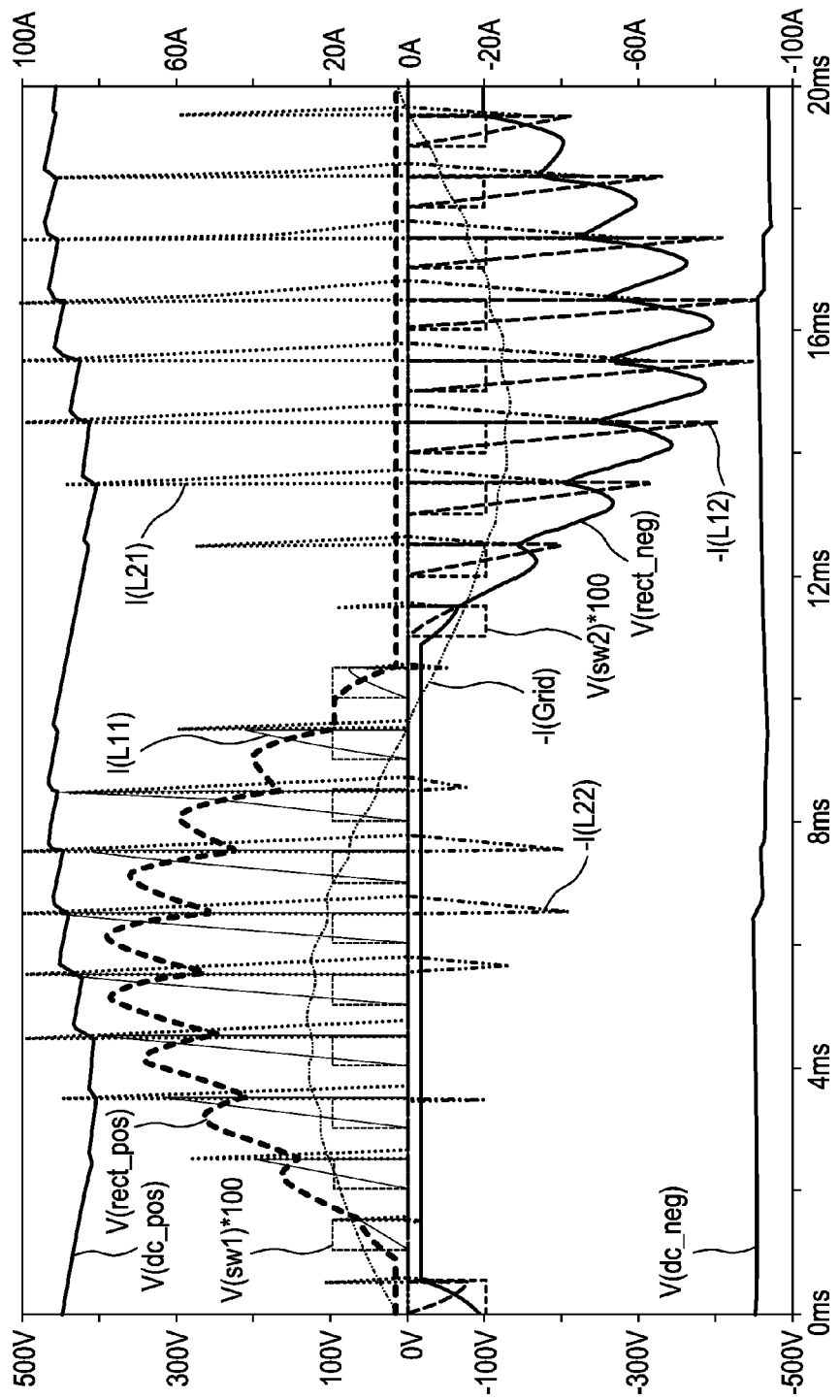
FIG. 5 shows a timing diagram with waveforms of currents and voltages in the rectifying circuit of the third embodiment with asymmetric load at the DC outputs.

FIG. 5 shows a similar timing diagram for an unbalanced case with e.g. R1=55Ω and R2=500Ω. The sum of the output powers is the same in both cases. For illustration purpose, the simulation circuit is dimensioned to operate with only 10 switching cycles per half-wave period of the AC voltage. In a real embodiment, the switching frequency would be selected much higher in the 10 or 100 kHz range, such that 1000 or even 10000 switching cycles would fit into one half-wave period or cycle. FIGS. 4 and 5 show the steady state after several grid cycles.

In the following, operation of the circuit of FIG. 3 is explained based on the signal waveforms shown in FIGS. 4 and 5.

The operation is different during a positive and a negative half-wave of the AC grid voltage. This can be identified by the signal waveforms V(rect_pos) and V(rect_neg) of the rectified voltages across C1 and C2 in FIGS. 4 and 5.

During a positive half wave of the input voltage, switch S1 switches with the switching frequency and a certain duty cycle. The respective signal V(sw1) represents the control signal of the switch S1. If it is positive, the switch S1 is closed, if it is zero, the switch S1 is open. During this positive half-wave, the other switch S2 remains open. If S1 closes, an increasing current flows through primary inductor or winding L11, as shown by the respective waveform I(L11), which charges the winding L11. If the switch S1 opens, the magnetic device (i.e. transformer) can discharge only via the secondary inductors or windings L21 and L22 through diodes D3 and D4 on the secondary side. The waveforms I(L21) and –I(L22) of the discharging currents are shown in FIGS. 4 and 5.

During a negative half-wave of the input voltage, the switch S1 remains open. Instead, the switch S2 switches with the switching frequency and a certain duty cycle. The waveform V(sw2) of the control signal of the switch S2 is shown in FIGS. 4 and 5. If it is negative, the switch S2 is closed, if it is zero, the switch S2 is open. The function is similar to the positive half-wave cycle: If the switch S2 closes, an increasing current flows through the respective inductor or winding L12, as shown in the respective waveform –I(L12) of the timing diagram, which charges the inductor. If the switch S2 opens, the magnetic device (i.e. transformer) can discharge only via the secondary windings L21 and L22 through diodes D3 and D4 on the secondary side.

If the two DC phases are symmetrically loaded, the discharge current is equally distributed to L21 and L22 (as shown in FIG. 4). If the DC phases are asymmetrically loaded, the phase, which has less power demand receives less discharge current (as shown in FIG. 5). The current is intrinsically distributed, such that the output voltage remains constant. The timing diagrams of FIGS. 4 and 5 show the waveform of the positive DC output voltage V(dc_pos), and the negative DC output voltage V(dc_neg). Both have a little ripple due to the low switching frequency. It can be clearly seen that the DC output voltages remain constant even with asymmetrical load.

Furthermore, the discharging currents are the same for the positive and negative half-wave cycle of the AC grid voltage. This means that the power taken from the AC grid is the same for the positive and the negative half-wave cycle, even if the load on the DC-side is asymmetrically distributed among the two phases. The timing diagrams of FIGS. 4 and 5 show the input current I(Grid) drawn from the AC grid. It can be seen that it is symmetrical, even with unbalanced load (FIG. 5). In addition, it can be seen that the input current drawn from the AC grid is well sinusoidal with a constant duty cycle of the switching pattern. This makes the control easy.

To summarize, a rectifying method and circuit using a magnetically coupled double flyback converter have been described. The main circuit can consist of only one transformer, two switches, two low frequency diodes, two high frequency diodes and two capacitors, so that power is inherently distributed according to the demand on the two DC phases and a sinusoidal grid current can be obtained without sophisticated control.

While the invention has been illustrated and described in detail in the drawings and foregoing description, such illustration and description are to be considered illustrative or exemplary and not restrictive; the invention is not limited to the disclosed embodiment. Other variations to the disclosed embodiment can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A rectifying circuit for providing an interface between an alternating current supply grid and a direct current grid, said circuit comprising:
    a transformer having a first and second primary windings and first and second secondary windings;
    a first half-wave rectifier for outputting positive half-waves of an AC signal supplied from said AC supply grid;
    a second half-wave rectifier for outputting negative half-waves of said AC signal;
    a first controlled switch for continuously switching on and off supply of said positive half-waves to said first primary winding during each of said positive half-waves;
    a second controlled switch for continuously switching on and off supply of said negative half-waves to said second primary winding during each of said negative half-waves;
    a first rectifier circuit connected to said first secondary winding of said transformer for generating a first DC output voltage based on a discharge current of said transformer during a switched-off state of said first and second controlled switches; and
    a second rectifier circuit connected to said second secondary winding of said transformer for generating a second DC output voltage based on a discharge current of said transformer during said switched-off state of said first and second controlled switches.

2. The circuit according to claim 1, wherein said first and second primary windings are both connected with one end to a neutral line of said AC grid, and wherein said first and second secondary windings are both connected with one end to ground potential of said DC grid.

3. The circuit according to claim 2, wherein said neutral line is directly connected to said ground potential.

4. The circuit according to claim 1, wherein said first and second rectifier circuits each comprise one diode and one capacitor only.

5. The circuit according to claim 1, wherein said first and second half-wave rectifiers each comprise one diode only.

6. The circuit according to claim 1, further comprising a first filter capacitor connected in parallel to the output of said first half-wave rectifier and a second filter capacitor connected in parallel to the output of said second half-wave rectifier.

7. The circuit according to claim 1, wherein said circuit is adapted to generate said first and second DC voltages with same absolute values.

8. The circuit according to claim 1, wherein a switching frequency of said first and second controlled switches is selected in the 10 or 100 kHz range.

9. A method of providing an interface between an alternating current supply grid and a direct current grid, said method comprising the steps of:
    rectifying an AC signal supplied from said AC supply grid to generate positive half-waves of said AC signal;
    rectifying said AC signal to generate negative half-waves of said AC signal;
    continuously switching on and off supply of said positive half-waves to a first primary winding of a transformer during each of said positive half-waves;

continuously switching on and off supply of said negative half-waves to a second primary winding of said transformer during each of said negative half-waves;

generating a first DC output voltage based on a discharge current in a first secondary winding of said transformer during a switched-off supply state of said positive and negative half-waves; and generating a second DC output voltage based on a discharge current in a second secondary winding of said transformer during a switched-off supply state of said positive and negative half-waves.

* * * * *